United States Patent Office 3,306,705
Patented Feb. 28, 1967

3,306,705
PROCESS FOR MAKING SILICON CARBIDE
Günter Leineweber and Walter Neugebauer, Constance, Germany, assignors to Deutsche Gold- und Silber-Scheideanstalt vormals Roessler, Frankfurt, Germany
No Drawing. Filed Sept. 6, 1962, Ser. No. 221,861
Claims priority, application Germany, Sept. 8, 1961, D 36,989
12 Claims. (Cl. 23—208)

The present invention relates to a process for producing silicon carbide in a new physical form, that is in a finely divided beta crystalline, fibrous form, from certain silicon containing compounds and certain carbon containing compounds in the gaseous state and to the resulting novel finely divided silicon carbide product containing a substantial proportion of fibrous silicon carbide.

Presently silicon carbide is produced by the reduction of quartz sand with coke in the presence of common salt and sawdust, the charge of the materials being heated in an electrical resistance furnace, arc furnace, or other high temperature heating unit to about 2000° C. At this temperature, the charge mixture is converted into silicon carbide and carbon monoxide in accordance with the overall equation $SiO_2 + 3C \rightarrow SiC + 2CO$. The operation is discontinuous and the liberated carbon monoxide is burned off. When the furnace cools, the top layer is removed and lumps of silicon carbide are collected. These lumps are then crushed, screened, ground, washed, leached, dried and classified to prepare the silicon carbide in marketable, usable form.

It is an object of the present invention to provide an improved process for the production of silicon carbide which may be carried out continuously.

Another object of the invention is to produce silicon carbide in a novel finely divided essentially beta crystalline form wherein substantial quantities are in the form of fine fibers.

According to the invention it was found that these objects could be attained by providing an oxidic silicon compound in the gaseous phase and reacting such oxidic silicon compound with a gaseous phase hydrogen containing carbon compound which in addition to hydrogen and carbon may also contain oxygen provided the ratio of carbon to oxygen is at least 1:1 and preferably at least 2:1.

The process according to the invention can advantageously be carried out by converting the oxidic silicon compound as well as the hydrogen and carbon containing compound into the gaseous state insofar as they are not already in such state and introducing them quickly in such gaseous state into a reaction space maintained at high temperatures sufficient to effect reaction between the oxidic silicon compound and the carbon containing compound and effecting intensive turbulent mixture of such gaseous reactants. It is not necessary that the entire reaction take place with both reactants in the gas phase, it only being necessary that they both be in the gas phase at the beginning of the reaction. Preferably, however, the reaction is carried out under such temperature and pressure conditions that at least the major portion if not substantially all of the reaction is completed with the reactants in the gas phase. The finely divided fibrous silicon carbide is swept out of the reaction space by the gases generated in the process and by any residual unconverted gaseous carbon containing compound or other gases which may have been added and after cooling is readily separated from the gas stream by any suitable filtering or screening technique such as in a bag filter or centrifuge.

It was found that the more rapidly and intensively the gaseous reactants are mixed, the higher the yield of the silicon carbide will be. Preferably, the reactant gases are mixed as near the outlet of the furnace or other heating device wherein the silicon oxide vapors are generated as the silicon oxide vapors are at their highest temperature at this point. Excessive cooling of the gaseous mixture before the reaction is complete leads to the presence of residual unconverted solid silicon oxide in the silicon carbide composition produced. Unconverted silicon oxide can be removed from the final product, when a very pure silicon carbide is desired, by treatment with a solvent such as caustic soda and the like which will dissolve all silicon compounds occurring in the process except silicon carbide. A water wash will remove the caustic solvent leaving substantially pure silicon carbide. For most uses, however, it is not necessary that the silicon oxide content of the silicon carbide product according to the invention be removed. The physical properties as to particle size, density and surface area of the silicon oxide containing product substantially correspond to those of the purified silicon carbide. The crude finely divided silicon carbide products according to the invention can, for example, contain at least 35 to 65% of silicon carbide and the remainder essentially silicon oxide and carbon.

Any of the various silicon oxides, silicon monoxide (SiO), silicon dioxide ($SiO_2$), a newly reported silicon oxide of the formula $Si_2O_3$ or mixtures of these can be used as the oxide starting material employed in the process according to the invention. The preferred silicon oxide is silicon monoxide. Silicon monoxide in gaseous state can be formed by reaction of a silicon dioxide containing starting material, such as quartz, quartz sand or a silicate, such as aluminum silicate, with a reducing agent, such as carbon black, carbon coke, silicon, aluminum, magnesium and the like, primarily at temperatures over 1400° C. although also at somewhat lower temperatures when measures such as vacuum or addition of diluent gases which lower the condensation temperatures of silicon monoxide are employed. Such production of gaseous silicon monoxide in an electric arc furnace, for example, is taught in U.S. Patent 2,823,979. Gaseous silicon dioxide can be formed by heating quartz alone but the temperatures required are usually over 2000° C. A mixture of gaseous silicon monoxide and gaseous silicon dioxide can be obtained when a mixture of quartz and coke with an excess of quartz is heated in an electric arc. Present techniques render the continuous production of gaseous silicon monoxide possible.

While gas streams containing silicon monoxide can be produced already at temperatures of about 1400° C., it is preferable that temperatures of over about 1800 to 1900° C. to about 2500° C. are attained in the vapor phase silicon monoxide supplied for reaction with the gaseous hydrogen and carbon containing compound.

The silicon oxide gases formed in the high temperature reaction chamber of the electric furnace can issue from the chamber under the pressure generated by the reaction itself, or they may be driven from the chamber by a stream of a gas fed into the chamber at an appropriate place. Naturally the gas stream must be of such a nature that it will not enter into an undesirable reaction with the silicon oxides. Hydrogen, nitrogen, argon, or other inert gases may be employed.

The hydrogen and carbon containing compounds which are reacted according to the invention in the gaseous state with the gaseous silicon oxide can, for example, be aromatic or aliphatic or mixed aliphatic aromatic hydrocarbons but also such carbon compounds which consist of carbon, hydrogen and oxygen, provided the ratio of carbon to oxygen atoms is at least 1 and preferably at least 2 can be used. The lower alkanes and especially methane have proved especially suited as the hydrocarbon reactant. However, other aliphatic or aromatic hydrocarbons as well as alcohols, ethers, ketones, light and heavy oils and the like can also be used.

As already generally indicated above, the manner in which the gaseous reactants are mixed is of considerable importance and that it is essential that the gaseous silicon oxide reactant and the gaseous hydrogen and carbon containing compound be effected as efficiently, quickly and thoroughly as possible so as to provide turbulent mixing conditions rather than lamiar flow mixing conditions.

While perforce the gaseous silicon oxide reactant must already be at a relatively high temperature before admixture with the hydrogen and carbon containing reactant, it is obvious that high temperatures are not necessary to provide the latter reactant in the gaseous state as hydrocarbons such as the lower alkanes are either already in the gaseous state at room temperature or are easily volatilized at comparatively low temperatures.

The temperature of the gaseous hydrogen and carbon containing reactant before actual admixture with the highly heated gaseous silicon oxide should be kept below such a temperature at which thermal decomposition of the hydrogen and carbon containing compound with any substantial liberation of carbon occurs. The gaseous hydrogen and carbon containing reactant can be preheated provided it can be maintained at a temperature below that where cracking with any substantial carbon liberation takes place before actual contact with the gaseous silicon oxide. Some preheating, unless very special cooling measures are taken, usually occurs in the supply means in view of the proximity to the highly heated reaction zone and must be controlled to avoid cracking with substantial carbon liberation. Such controlled preheating assists in preventing too rapid a cooling of the reactant mixture in view of the endothermic nature of the reaction involved. In addition, when arc furnaces are employed in the production of the gaseous silicon oxide it is preferable that the gaseous hydrogen and carbon containing compound be mixed with the gaseous silicon oxide in the radiation field of the arc and as closely above the arc as possible so as to ensure that the reaction proceeds while the reactants are maintained at as high a temperature as practical. As is well known to those skilled in the art, other measures may be taken which reduce the tendency of the silicon oxide to condense, such as, by reduction of the condensation temperature in the reaction mixture, by reduction of overall pressure or the partial pressure of the silicon oxide by addition of inert diluent gases.

The exhaust gases after separation of the silicon carbide product which contain hydrogen and carbon monoxide normally produced as by-products of the reaction forming the silicon carbide in the process according to the invention and the carbon monoxide also usually formed together with silicon monoxide when the latter is produced in an electric arc furnace from $SiO_2$ and a carbon containing reducing agent may be recycled together with any hydrogen and carbon containing compounds which also may remain in the exhaust gases after separation of the silicon carbide product. The presence of excess hydrogen in the gaseous reaction mixture assists in repressing the liberation of carbon.

Upon examination the light gray to dark gray finely divided silicon carbide product obtained in the process according to the invention is found to be quite different from silicon carbide available in commerce and also known as Carborundum as well as other forms of silicon carbide which are not the normal commercial form. The particle size, particle shape and bulk density differ greatly from those of presently known commercial silicon carbides which are not produced in a vapor phase reaction. Normal commercial silicon carbide is in the alpha system with hexagonal and rhombohedral structure. The novel silicon carbide product according to the invention is crystallized in the cubic beta system. The product is primarily characterized by the presence of (1) thin fibrous particles mostly strongly curled and sometimes branched of up to 1500 m$\mu$ in length, predominantly between 50 and 800 m$\mu$, and up to 60 m$\mu$, predominantly 5–15 m$\mu$ in diameter, (2) rounded particles with diameters up to 600 m$\mu$, predominantly between 10 and 200 m$\mu$ and (3) crystallographically defined particles with dimensions up to 500 m$\mu$, predominantly only up to 250 m$\mu$ (occasionally such crystals occurring as very thin platelets which are transparent to electrons).

The specific surface area of the silicon carbide product produced according to the invention is 50–300 m.$^2$/g. (measured according to B.E.T.) and its bulk density 10–50 g./l. and its shaken density 15–80 g./l. Furthermore, such silicon carbide product is very easily wettable with polar and nonpolar inorganic or organic liquids.

The above data is for the purified silicon carbide product according to the invention after washing to dissolve out any silicon oxide content therein. As has previously been indicated the crude silicon oxide containing product has similar properties as to particle size, density and surface area. However, the silicon oxide present therein is mostly in the form of round and fibrous particles but not as crystallographically defined particles.

The silicon carbide which is produced by vapor phase reaction from silicon oxides and hydrogen and carbon containing compounds according to the invention also differs from the silicon carbide produced in rather minute quantities as a by-product in condensed silicon monoxide obtained from heating silica and carbon to sufficiently high temperatures as in U.S. Patents 1,104,384 and 2,823,979 in that the latter is substantially of round amorphous particles which agglomerate to sponge like secondary structures and contains practically no fibrous particles although a considerable proportion of the silicon monoxide particles from which they may have been derived and with which they are associated are of fibrous nature.

The quantity of silicon carbide produced as a by-product of silicon monoxide probably by reaction of the latter with the CO which also is a by-product usually is only of the order of 1 or a very few percent of the solid silicon monoxide product and theoretically even cannot exceed 25% by weight as the reaction involved is

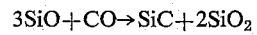
$$3SiO + CO \rightarrow SiC + 2SiO_2$$

2 mols of silicon dioxide are produced for every mol of silicon carbide. Thermodynamic considerations, however, reduce the silicon carbide formation to not over a few percent of the solid reaction product obtained in the production of silicon monoxide.

The process according to the invention employing hydrogen containing carbon compounds in the production of silicon carbide from silicon oxides has the advantage that the solid silicon carbide products recovered could theoretically contain 100% of silicon carbide as can be seen from the following illustrative equation:

$$SiO + 2CH_4 \rightarrow SiC + CO + 4H_2$$

and actually the crude products according to the invention can contain over 60% of silicon carbon.

The process according to the invention for the production of silicon carbide furthermore not only has the advantage that it can be carried out continuously but also that the silicon carbide is recovered directly in finely divided form avoiding the expensive crushing, grinding and screening operations which heretofore have been customarily employed in the commercial production of silicon carbide in powdery form. Also, the silicon carbide produced according to the invention is practically free of iron and aluminum compounds.

The purified as well as the crude silicon carbide compositions produced according to the invention can be used as pigments, thickening agents for liquids, fillers, as well as for grinding and polishing compositions.

The following examples will serve to illustrate the invention with reference to several embodiments thereof.

Example 1

Quartz sand and coke were mixed in proportions of 5:1 by weight in an electric arc furnace which was closed except for an opening at its top which permitted the gaseous reaction products to escape from the furnace chamber to a reaction chamber. The opening between the furnace and the reaction chamber was surrounded by a mixing ring or tube containing equally spaced ports or holes to supply and mix the carbon containing gaseous compound with the gaseous silicon oxide and other reaction gases leaving the furnace and entering the reaction chamber. The reaction chamber was in turn connected to a heat exchanger and a group of two centrifugal separators. The system was maintained at atmospheric pressure. After the system was flushed with nitrogen, an arc was struck to initiate the reaction between the coke and sand and evolve gaseous silicon monoxide and by-product carbon monoxide. The gas stream rising from the furnace at a temperature of 2000–2500° C. was measured and found to contain 4.0 kg. of SiO and 2.5 kg. of CO per hour. Precautions were taken to prevent air from entering the reaction chamber (which had been purged with nitrogen). Through the mixing ring, 3.0 kg. per hour of methane were forced into the reaction chamber, mixing violently with the gaseous SiO and CO furnace products. Finely divided reaction products formed and were carried from the reaction chamber by the stream of mixed hot gases. The gas stream was cooled in the heat exchanger, then passed through the two centrifugal separators where solid reaction product was removed. The gases were collected and saved. 3.78 kg. solid material were collected per hour and contained 2.28 kg. SiC, 1.49 kg. unconverted SiO, and 0.01 kg. carbon. The product was of a light gray color, a surface area of 120 m.$^2$/g., a bulk density of 35 g./l. and in an X-ray diffraction investigation gives the lines of cubic beta silicon carbide (in addition to elemental silicon and amorphous silicon dioxide as derived by partial disproportionation of the solid silicon monoxide, SiO). An electron microscope study of the product shows fibrous particles with lengths up to 1000 m$\mu$ and diameters up to 20 m$\mu$ as well as round particles with diameters up to 400 m$\mu$ and crystallographically defined particles with dimensions up to 400 m$\mu$. The various types of particles are present in almost equal quantities.

Example 2

5 kg. of the product of Example 1 were stirred in 13 liters of 30% sodium hydroxide at 90–100° C. for 4 hours. The unreacted silicon monoxide was dissolved and after the mixture was filtered, washed and dried, 2.8 kg. of pure silicon carbide remained.

This pure product is light gray in color, has a surface area of 205 m.$^2$/g. and in the X-ray diffraction shows only the lines of beta silicon carbide. The electron microscope revealed similar particle make up as in the crude product of Example 1 but in this instance the fibrous and crystalline particles predominated.

Example 3

A gas stream of 4.0 kg. SiO and 2.5 kg. CO per hour was produced and mixed as in Example 1 in the absence of air with a mixture of 3.5 Nm.$^3$ of methane and 3.0 Nm.$^3$ per hour of exhaust gases from the reaction recovered from the preivous run. Such exhaust gases were recycled after removal of the solid product in the cyclones and contained 28% methane, 21% carbon monoxide, and 51% hydrogen. The amount of reaction product (solid) obtained per hour was 3.8 kg. containing 2.1 kg. of silicon carbide.

The product was gray in color and had a surface area of 104 m.$^2$/g.

Example 4

A mixture in parts by weight of 2.1:1 of ground quartz and pulverized silicon was reacted in an electric arc furnace to form gaseous silicon monoxide. The gas stream left the furnace at about 2500° C. and contained 8.5 kg. of SiO per hour. It was mixed with a gaseous mixture of 4.5 Nm.$^3$ methane and 2.0 Nm.$^3$ hydrogen per hour. 8.00 kg. per hour of solid product containing 5.25 kg. of silicon carbide were collected in the separators.

Example 5

A gas stream of 4.0 kg. SiO and 2.5 kg. CO per hour was obtained and mixed as in Example 1 in the absence of air with 14.5 Nm.$^3$ of ethylene per hour. 4.92 kg. per hour of raw product containing 2.16 kg. silicon carbide, 1.63 kg. unconverted silicon monoxide and 1.13 kg. carbon was collected. The raw product is black, has a surface area of 57 m.$^2$/g. and a shaken density of 80 g./l. It primarily comprises crystalline and round particles with dimensions up to 250 m$\mu$. The proportion of fibrous particles is very small. The X-ray diffraction pattern indicates it is beta silicon carbide.

Example 6

A gas stream of 4.0 kg. SiO and 2.5 kg. CO per hour was produced and mixed as in Example 1 in the absence of air with a gaseous mixture of 4 Nm.$^3$ propylene and 8 Nm.$^3$ hydrogen per hour. 4.52 kg. per hour of crude solid product were recovered. This contained 1.68 kg. silicon carbide, 2.16 kg. unconverted silicon monoxide, and 0.68 kg. carbon. The product is dark gray, has a surface area of 91 m.$^2$/g. and a shaken density of 49 g./l. The propylene employed was withdrawn from a tank as a liquid and heated to effect its vaporization before mixture with the hydrogen.

Example 7

A gas stream of 4.0 kg. SiO and 2.5 kg. CO per hour was produced and mixed as in Example 1 in the absence of air with a mixture of vaporized $C_3$–$C_4$ hydrocarbons and hydrogen. The mixed $C_3$–$C_4$ gases amounted to 5 Nm.$^3$; the amount of hydrogen was 10 Nm.$^3$. 4.12 kg. per hour of product containing 1.77 kg. silicon carbide, 2.06 kg. unreacted silicon monoxide and 0.29 kg. carbon were collected. The product was brown gray in color with a surface area of 90 m.$^2$/g. and a shaken density of 40 g./l.

Example 8

A gas stream of 4.40 kg. SiO and 2.75 kg. CO per hour was produced and mixed as in Example 1 at temperatures of 1900–2200° C. with 7.5 Nm.$^3$ methane. 4.25 kg. per hour of solid product collected in the separator and contained 1.58 kg. silicon carbide, and 2.67 kg. unconverted silicon monoxide. The color was light gray; the surface area 174 m.$^2$/g. and the shaken density 30 g./l.

Example 9

6½ kg. of the product of Example 8 were treated with 18 liters of 30% sodium hydroxide with stirring at 90° C. for 3 hours to remove silicon monoxide. After filtering, washing an drying, 2.3 kg. of silicon carbide were obtained.

The silicon carbide was light gray in color and had a surface area of 283 m.$^2$/g. The X-ray diffraction pattern is that of beta silicon carbide. The electron microscope shows many fibrous particles with lengths up to 500 m$\mu$ and diameters up to 15 m$\mu$. In addition to the fibrous particles smaller quantities of spherical and crystalline particles up to 300 m$\mu$, mostly up to 100 m$\mu$, were present.

Example 10

A gas stream containing 4.0 kg. of SiO and 2.5 kg. of CO per hour was produced and mixed in the absence of air as in Example 1 with a gas mixture of 3.1 Nm.$^3$ of acetone and 6.0 Nm.$^3$ of recycled exhaust reaction gases per hour. The recycled exhaust reaction gases contain hydrogen, CO, unconverted acetone and small quantities of hydrocarbons formed by cracking. 3.9 kg. per hour of solid product containing 1.1 kg. of silicon carbide were collected.

The product was of a light gray color and had a specific surface area of 110 m.²/g. and a shaken density of 41 g./l. In an X-ray diffraction diagram it gave the lines of cubic β SiC. It was hydrophobic in the presence of water.

We claim:

1. A process for the production of finely divided silicon carbide which comprises reacting an intimate turbulent mixture of a vapor phase silicon oxide and a vapor phase carbon compound selected from the group consisting of hydrocarbons and carbon compounds containing only atoms of carbon, hydrogen and oxygen wherein the ratio of carbon to oxygen atoms is at least 1:1.

2. The process of claim 1 in which said reaction is carried out at a temperature between about 1400° C. and 2500° C.

3. The process of claim 2 in which said reaction is carried out at a temperature of at least about 1800° C.

4. The process of claim 1 in which said silicon oxide is silicon monoxide.

5. The process of claim 1 in which said carbon compound is a lower aliphatic hydrocarbon.

6. The process of claim 1 in which said carbon compound is methane.

7. The process of claim 1 in which said reaction mixture contains an inert diluent gas.

8. The process of claim 1 in which said reaction mixture contains carbon monoxide.

9. A process for the production of finely divided silicon carbide which comprises rapidly, intimately and turbulently mixing a vapor phase carbon compound selected from the group consisting of hydrocarbons and carbon compounds containing only atoms of carbon, hydrogen and oxygen wherein the ratio of carbon to oxygen atoms is at least 1:1 with vapor phase silicon monoxide at a temperature between about 1400 and 2500° C. and separating the finely divided solid product produced from the gaseous components of the reaction mixture.

10. The process of claim 9 in which said vapor phase carbon compound is maintained at a temperature below that at which thermal decomposition thereof with substantial liberation of carbon occurs before its mixture with the vapor phase silicon oxide.

11. The process of claim 9 in which the vapor phase carbon compound is diluted with an inert gas before its admixture with the vapor phase silicon oxide.

12. The process of claim 9 comprising in addition recycling a portion of the gaseous components of the reaction mixture from which the finely divided solid product has been separated and mixing such recycled gaseous components with the vapor phase carbon compound before its admixture with the vapor phase silicon oxide.

References Cited by the Examiner
UNITED STATES PATENTS 3,161,473   12/1964   Pultz _____ 23—208
3,175,884   3/1965    Kuhn _____ 23—208

OTHER REFERENCES

Campbell et al., article in Transactions of the Electrochemical Society, Vol. 96 (1949), pp. 318–333.

O'Connor et al., Silicon Carbide, Pergamon Press (1960), pp. 78–82 and 101.

OSCAR R. VERTIZ, *Primary Examiner.*

MAURICE A. BRINDISI, BENJAMIN HENKIN,
*Examiners.*

A. J. STEWART, G. T. OZAKI, *Assistant Examiners.*